(12) United States Patent
Davis

(10) Patent No.: US 9,969,284 B2
(45) Date of Patent: May 15, 2018

(54) BATTERY MONITOR FOR USE IN RECHARGING AND COOLING BATTERIES FOR EXCHANGE IN VEHICLES, SUCH AS FORK TRUCKS

(71) Applicant: James Kenneth Davis, Clemmons, NC (US)

(72) Inventor: James Kenneth Davis, Clemmons, NC (US)

( * ) Notice: Subject to any disclaimer, the term of this patent is extended or adjusted under 35 U.S.C. 154(b) by 90 days.

(21) Appl. No.: 15/074,506

(22) Filed: Mar. 18, 2016

(65) Prior Publication Data

US 2016/0276858 A1    Sep. 22, 2016

Related U.S. Application Data

(60) Provisional application No. 62/135,752, filed on Mar. 20, 2015.

(51) Int. Cl.
*H02J 7/00* (2006.01)
*B60L 11/18* (2006.01)

(52) U.S. Cl.
CPC ....... *B60L 11/1822* (2013.01); *B60L 11/1861* (2013.01); *B60L 11/1874* (2013.01); *H02J 7/0021* (2013.01); *H02J 2007/005* (2013.01)

(58) Field of Classification Search
CPC .. H02J 7/04; H02J 7/007; H02J 7/0021; H02J 7/0047; H02J 2007/005; B60L 11/1861; B60L 11/1874; B60L 11/1822
USPC .................................................. 320/132, 157
See application file for complete search history.

(56) References Cited

U.S. PATENT DOCUMENTS

2017/0149255 A1*    5/2017   Garcia-Acosta ...... H02J 7/0021

* cited by examiner

*Primary Examiner* — Paul Dinh
(74) *Attorney, Agent, or Firm* — Robert W. Pitts

(57) ABSTRACT

The present invention is a state of charge monitor to aid in choosing the correct battery when changing batteries. The present invention is battery based instead of charger based. A monitor unit is mounted on each battery and is wired to measure the voltage on a certain number of battery cells. By monitoring this voltage, a microcontroller in the unit can tell if the battery in use, under charge or completed charge. The microcontroller has programming allowing it to add timers to each state event to make sure a true transition has occurred and not just a transient voltage. The microcontroller will then indicate the state of the battery, so that a user can determine which batteries are suitable for use in an exchange.

20 Claims, 7 Drawing Sheets

FIG 2C
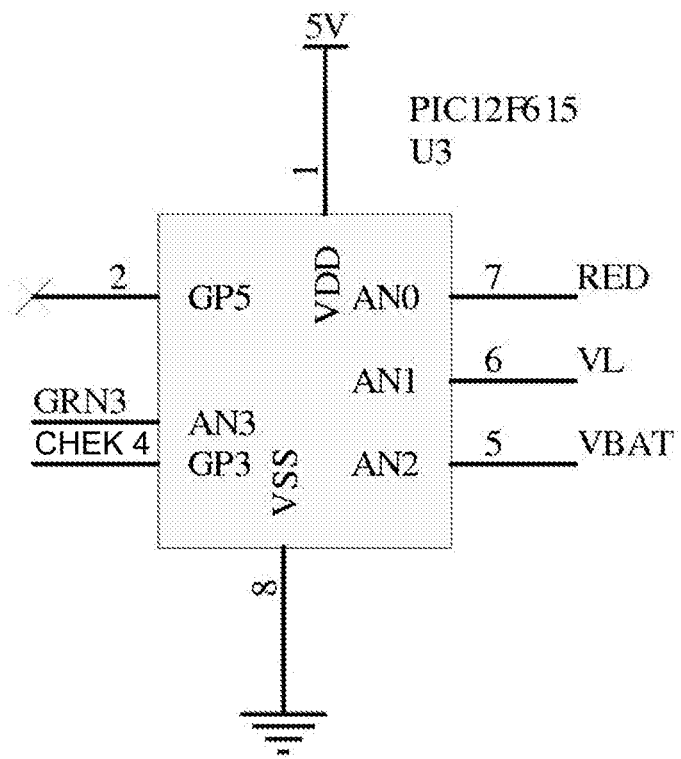
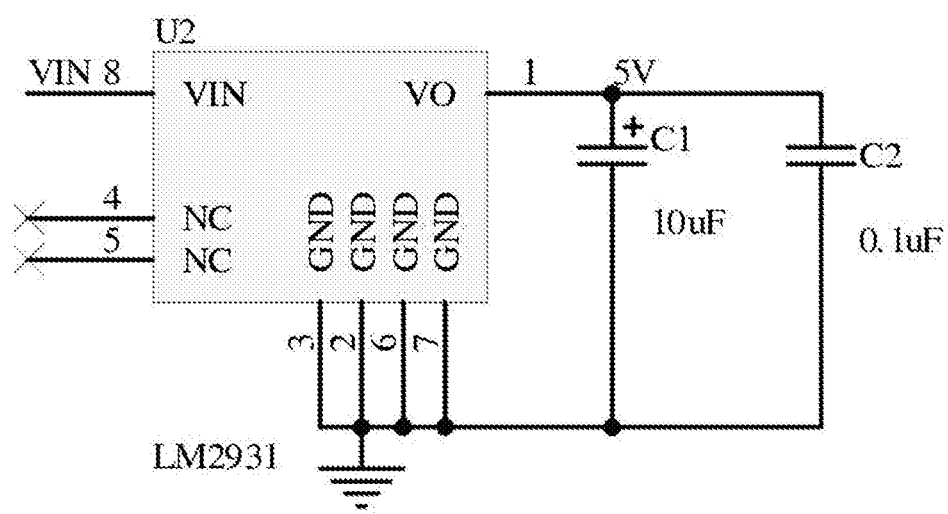

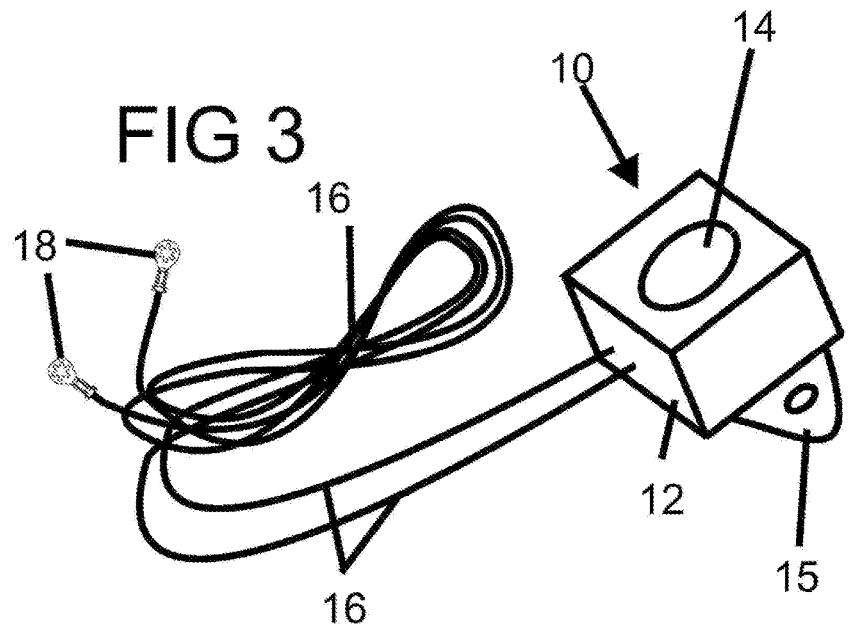
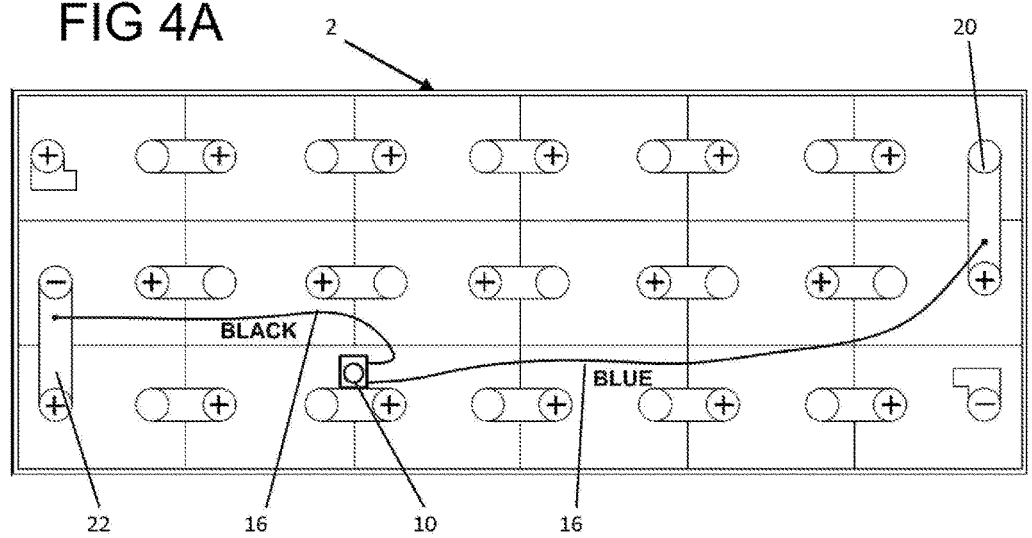

BATTERY MONITOR FOR USE IN RECHARGING AND COOLING BATTERIES FOR EXCHANGE IN VEHICLES, SUCH AS FORK TRUCKS

CROSS REFERENCE TO PRIOR CO-PENDING APPLICATION

This application claims the benefit or U.S. Provisional Patent Application Ser. No. 62/135,752, filed Mar. 20, 2015.

BACKGROUND OF THE INVENTION

This invention is related to an apparatus and method for use in monitoring the Discharge/Charge/Cooling cycle of industrial batteries used in vehicles such as lift trucks. This device aids in properly choosing a charged battery to exchange in a fork truck.

DESCRIPTION OF THE PRIOR ART

In many industrial fork truck applications, the user will purchase multiple batteries per fork truck or battery powered industrial material handling vehicle. This allows the user to be charging the extra batteries while using the fork truck. This strategy allows for multiple work shift use of a fork truck by changing batteries at the beginning of the shift.

These extra batteries are typically stored in a charger bank or rack so there is one central location to charge and change batteries (see FIG. 1). These racks may have multiple levels and vary in length. The user will employ an extraction device to remove the discharged battery from the fork truck. They will then place the discharged battery in an empty rack. The rack locations will have a connector to connect the battery to the charger. They will connect the discharged battery and the charger will start the charge cycle. The charge cycle will last from 4-8 hours after which a 4-8 hour cool down period is recommended, but not always observed in practice. After connecting the discharged battery, the user will pick a charged battery to place back in the fork truck. In large installations, a multi-tier charging rack capable of storing a large number of batteries is located in a battery room. Since the individual batteries can be very large and heavy, it is generally not possible to move the batteries without mechanical assistance, especially when a battery is located on an upper tier of the charging rack. Typically battery transfer carts and mechanical changers may be necessary to transfer batteries to and from the charging rack and to and from the vehicle in which the battery is to either be installed or removed. These transfer devices can employ hydraulic actuators. Especially in large installations, an operator may not actually come into contact with the batteries, either during charging or changing.

There are several challenges to implementing this strategy. For example:

Sometimes it is difficult to see the charger that is connected to the battery and determine if the charge cycle has completed. There is a risk of choosing a battery that is still under charge. This makes it difficult to choose a fully charged battery without looking at each charger.

It is advantageous to allow a battery to cool after charge in order to maximize the battery's performance and lifetime. This cooling period is typically 4-8 hours. It is difficult for the operator to determine which batteries have had sufficient cool down time. There is no easy way to determine how long a battery has been off charge.

If there was a charging error and the charger stopped prematurely, it is difficult for the operator to detect this. The charger may or may not signal an error. This makes it possible for the operator to pick an uncharged battery and not know it. This results in shortened run time for the fork truck and downtime during their shift.

There are battery management systems sold which attempt to alleviate these challenges. These prior art systems are attached to the battery charger and monitor the charger during the charge cycle. These are typically networked together and have a central control unit that determines which battery has completed charge for the longest period of time. It will display the specific battery that it wants to be used and will alarm in error if the incorrect battery is chosen. Some of these systems will even create reports showing which battery was picked, any incorrect picks, etc. While these systems address the need, the systems cost and complexity makes them a poor choice for many end users System costs are expensive in part because the cost of networking the monitors together and labor involved in installation. Users who do implement the system will many times ignore the data available to them. It's simply not important that someone picked the wrong battery as long as they picked a charged and cooled battery.

Another concern is that these charger based systems lose indication when the battery is unplugged from the charger. At this point the system assumes the battery is in use and drops it from its queue. In practice, the battery may have simply been unplugged and not put into use.

Another concern with current charger based systems is they do not give the user an overall status of the battery rack. The state indication is based on a system recommendation as to which specific battery or batteries should be picked. It does not easily indicate how many batteries are discharged, how many are charged and not cooled and how many are charged, cooled and ready to use.

Another concern with current charger based systems is they must have continuous power supplied to them. This usually means providing AC power to the main controller and then powering each individual unit through the networking cables. This adds cost and complexity to the installation.

SUMMARY OF THE INVENTION

The present invention solves the challenges of multiple batteries in a charging rack but does so in a very cost effective, simple to install and implement method. The present invention is battery based instead of charger based. A unit is mounted on each battery and is wired to measure the voltage on a certain number of battery cells. By monitoring this voltage, the microcontroller in the unit can tell if the battery is in use, under charge or completed charge. The microcontroller has programming allowing it to add timers to each state event to make sure a true transition has occurred and not just a transient voltage. The microcontroller will then indicate the state of the battery. Since this monitoring unit is battery based, the monitoring unit can also count and provide an indication of the number of charge cycles that the specific battery has been through.

A significant advantage over the prior art charger based systems is that a system based on the battery mounted monitor of this invention should be less costly and more cost effective, in terms of product cost, installation expense and operational expense. The system of the present invention should be less than one-fourth the cost of competing prior art systems. The installation time for the system according to this invention is estimated to be one-half the installation time of competing devices and allows the use of less skilled labor. Another advantage to customers is the continuous aspect of the monitor display. In the event of a complete power outage, the device according to this invention will still indicate the status of each battery, even during the outage. The fact that the monitor according to this invention shows status after a battery is disconnected from the charger is also a plus. Alternate systems lose all information or data about the battery after it is disconnected.

An autonomous charge state indicator in accordance with this invention is suitable for use on a rechargeable battery, and will visually indicate separate charge states of the battery. An adequately recharged battery can then selected from multiple batteries being recharged and can then be mounted in a battery powered industrial material handling vehicle. This indicator includes a voltage level monitoring circuit connectable between representative cells of the battery at different voltage levels. The magnitude of the different voltage levels is representative of the charge status of the entire battery. The different voltage levels applied to the charge state indicator are sufficient to power the autonomous charge state indicator. A visible light source displays differing patterns representative of different charge states of the battery in response to signals from the voltage level monitoring circuit. The visible light source is also powered by the different voltage levels of the battery powering the voltage level indicator. This visible light source can be detected from a distance. The autonomous charge state indicator is attached to only one battery and provides sufficient external communication through the visible light source to enable a user to determine if a specific battery is available to pick for installation in a battery powered industrial material handling vehicle.

According to another aspect of this invention, a rechargable lead-acid battery of the type suitable for use in a battery powered industrial material handling vehicle a plurality of lead-acid battery cells serially connected to deliver an output voltage suitable for powering the battery powered industrial material handling vehicle includes an autonomous charge state indicator. This charge state indicator is mounted on the rechargeable lead acid battery to visually indicate separate charge states of the battery, so that an adequately recharged battery can selected from multiple batteries being recharged and can then be mounted in a battery powered industrial material handling vehicle. This indicator includes a voltage level monitoring circuit connected to selected multiple serially connected lead-acid battery cells. The magnitude of the resultant voltage difference applied to the voltage level monitoring circuit is representative of the charge status of the entire battery and is sufficient to power the autonomous charge state indicator. As visible light source displays differing patterns representative of different charge states of the battery in response to signals from the voltage level monitoring circuit. The visible light source is also powered by the voltage difference applied to the voltage level monitoring circuit. The visible light source is detectable from a distance. This autonomous charge state indicator is attached to only one battery and provides sufficient external communication through the visible light source to enable a user to determine if a specific battery is available to pick for installation in the battery powered industrial material handling vehicle without requiring reference to other information.

A charging system for use in charging and circulating rechargeable lead-acid batteries in a fleet of battery powered industrial material handling vehicles is another aspect of this invention. This system includes a charging station including at least one charger and a charging rack for in which individual batteries in a discharged state are positioned and connected to a charger after removal from one the individual batteries from a battery powered industrial material handling vehicle. The individual batteries are in a discharge state, and the charging rack and the at least one charger has space to accommodate multiple batteries. An autonomous charge state indicator is mounted on and associated with each of the rechargeable lead-acid batteries to visually indicate separate charge states of the specific associated battery. An adequately recharged battery can then be selected from multiple batteries being recharged and can then be mounted in a battery powered industrial material handling vehicle. The indicator also includes a voltage level monitoring circuit connectable to selected multiple serially connected lead-acid battery cells in the associated lead-acid battery. The magnitude of the resultant voltage difference applied to the voltage level monitoring circuit is representative of the charge status of the entire associated battery and sufficient to power the autonomous charge state indicator. A visible light source displays differing patterns representative of different charge states of the associated battery in response to signals from the voltage level monitoring circuit. The visible light source is also powered by the voltage difference applied to the voltage level monitoring circuit. The visible light source is detectable by a user or operator from a distance. The autonomous charge state indicator is attachable to only one associated battery and provides sufficient external communication through the visible light source and not through the charger so that a user can determine if a specific battery is available to pick for installation in the battery powered industrial material handling vehicle without requiring reference to other information.

BRIEF DESCRIPTION OF THE DRAWINGS

FIG. 2B is a continuation of FIG. 2A. FIG. 2C is a schematic of electronic components employed in the autonomous charge state indicator to provide the microcontroller logic shown in FIGS. 2A and 2B.

FIG. 3 is a view of an individual battery monitor or autonomous charge state indicator.

FIG. 4A is a view of a typical fork truck battery (38"×16") with a battery monitor mounted thereon. This figure shows the relative scale of the monitor to a typical fork truck battery. This figure also shows an example of connecting the device to the battery. The wires to the monitor have ring terminals that are attached to the battery terminals via self-tapping screws.

DETAILED DESCRIPTION OF THE PREFERRED EMBODIMENT

Figure 1A:
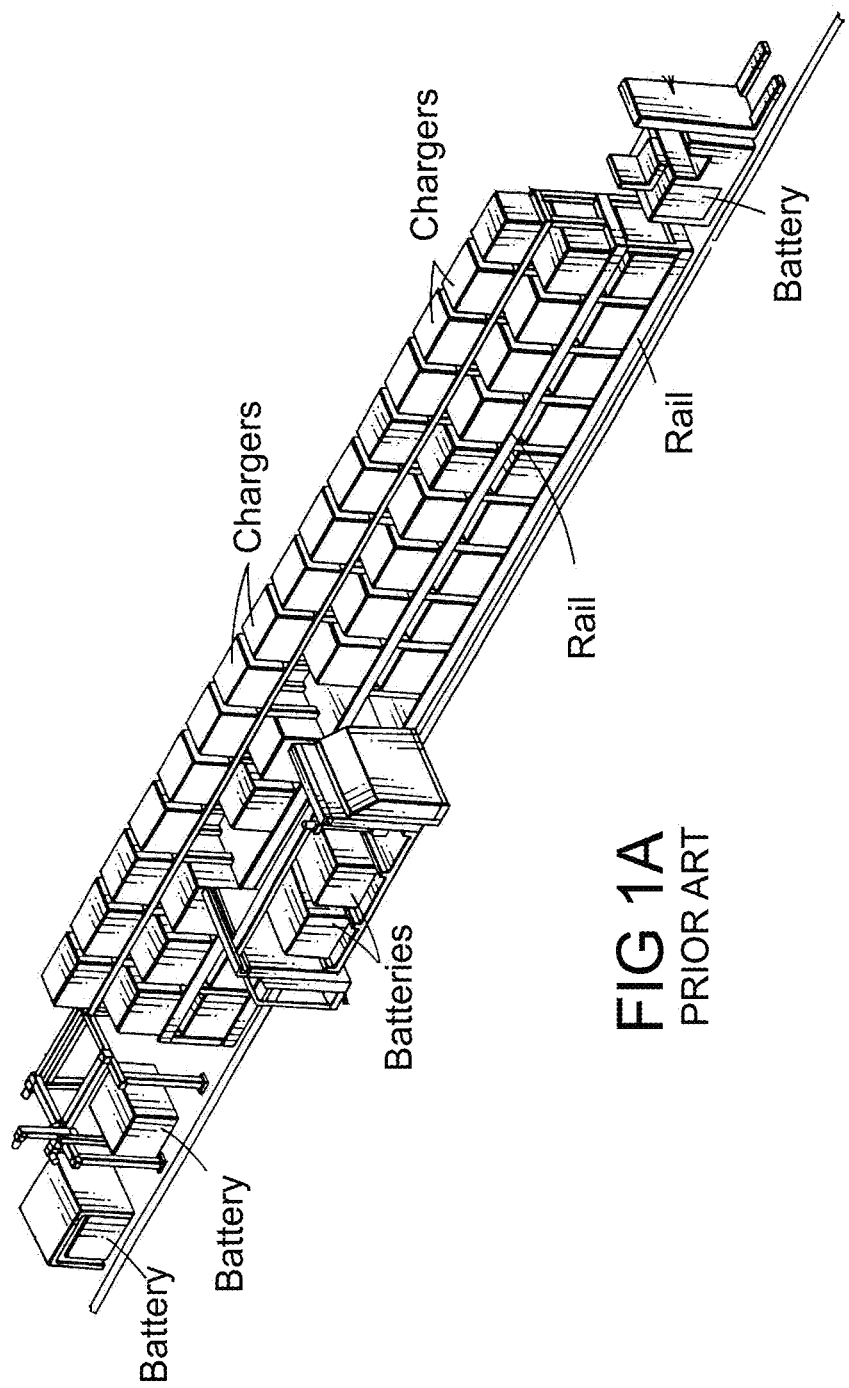
FIG. 1A is a view showing a typical battery charging and exchange station that can be used with Prior Art Monitoring Systems, but with which the battery monitors of the present invention can also be employed instead of the prior art monitoring system. Batteries can be stored on at least five levels in charging stations of this type, with the chargers at the top of each row of batteries being charged or made ready for use.

The autonomous charge state indicator or battery monitoring unit of the instant invention includes both a voltage level monitoring circuit and a visible light source that functions as sufficient external communication through the visible light source to enable a user to determine if a specific battery is available to pick for installation in a battery powered industrial material handling vehicle. An example of a battery powered industrial material handling vehicle would be a battery powered fork-lift or fork lift truck. An example of a battery powered fork lift truck is shown in U.S. Pat. No. 7,913,792, incorporated herein by reference. This example of a battery powered fork lift truck is only representative and the autonomous charge state indicator is suitable for use in battery powered industrial material handling vehicles and is not limited to the example incorporated herein by reference.

In the preferred embodiment of this invention, the voltage level monitoring circuit includes a circuit board containing a microcontroller with a built in analog to digital converter is potted into a box or housing 14 approximately 1"×1"×1". The board also contains a two color LED's 12, which function as the visible light source, and voltage divider circuit, safety fuses and a voltage regulator circuit to supply operating voltage to the microcontroller. The box 14 has two wires 16 to connect to the positive and negative connection points 20 and 22 on the battery 2 by conventional terminals 18. This connection is typically made using self-tapping screws. The monitor housing or box is mounted to the battery 2 by flanges 15 employing conventional tie straps extending through an opening in the flanges 15 and secured to one of the cell connectors on the associated battery. When located on the associated battery, this relatively small box and its leads will not interfere with other equipment, such as the valves and tubing employed for battery watering and refill. In the preferred embodiment, six cells will be monitored which will be 12 volts nominal. Six cells were chosen because the smallest industrial battery typically encountered is 12 volts (six cells). If a fork truck battery 2 has more than six cells, it is easy to connect to just six of the cells. This means the preferred embodiment can be used on any industrial fork truck battery 2. The total voltage output level of the lead-acid battery is a positive multiple of the different voltage levels powering the voltage level monitoring circuit. The microcontroller programming implements the basic logic in FIGS. 2A-2B to show the various battery "States", and the circuitry shown in FIG. 2C comprises the voltage level monitoring circuit.

In this preferred embodiment three separate charge states are indicated by the visible light indicator that is part of the autonomous charge state indicator. The three charge states are:

1: In use or under charge—Solid Yellow LED
2: Battery fully charged but not cooled—Blinking Blue LED
3: Battery is charged, cooled and ready to use—Solid Blue LED.

Figure 1B:
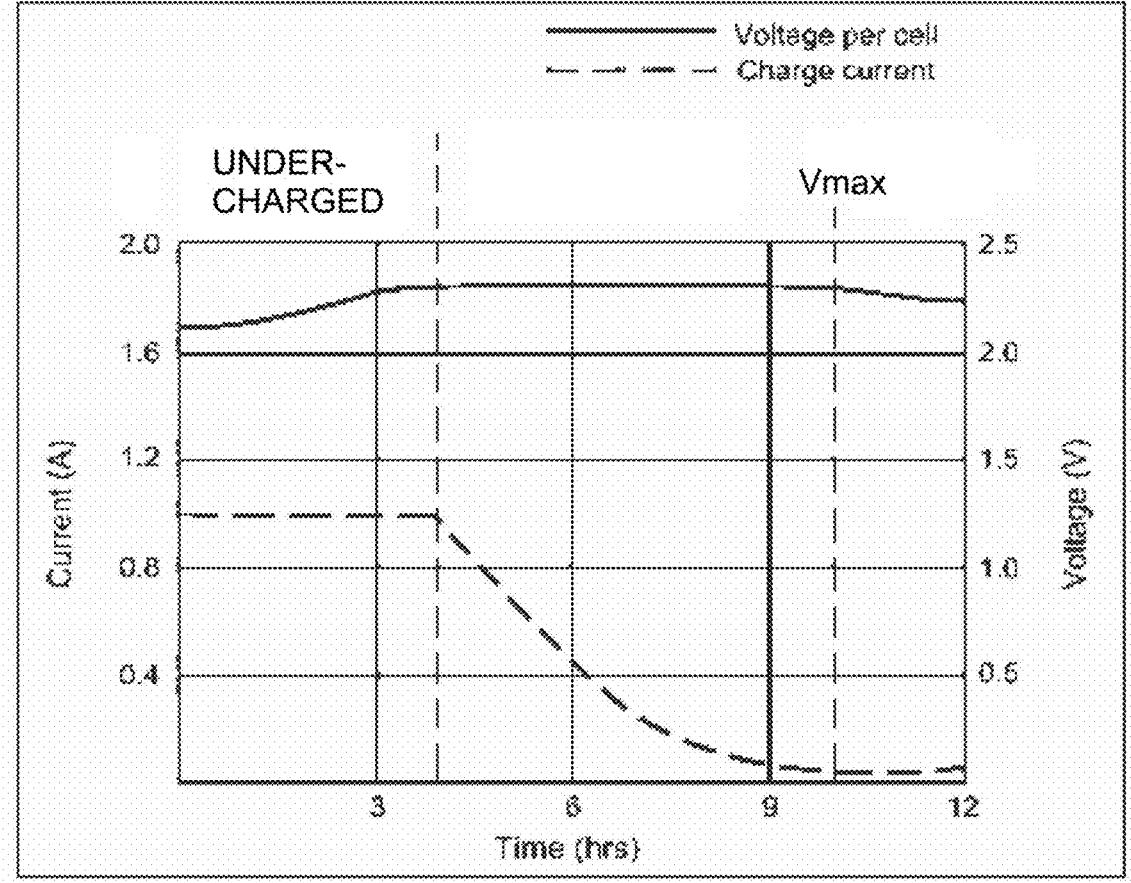
FIG. 1B shows prior art curves of voltage and current in a battery cell during charging of a typical lead-acid battery. The autonomous charge state indicator of the present invention detect when the battery is in a fully charged state after which the battery is cooled for a specific time period.

These charge states are represented by the typical prior art charging curve shown in FIG. 1B, which is the same for a conventional charging system, whether or not using the autonomous charge state indicator of the present invention. In other words, the use of the autonomous charge state indicator does not require any change in the normal charging process. The autonomous charge state indicator takes advantage of a small decrease in the voltage below a maximum voltage during charging, as shown in FIG. 1B. When this small decrease in voltage is detected, the visible light source or LED 12 displays a different pattern (blinking Blue) as instructed by the autonomous charge state indicator.

Figure 2A:
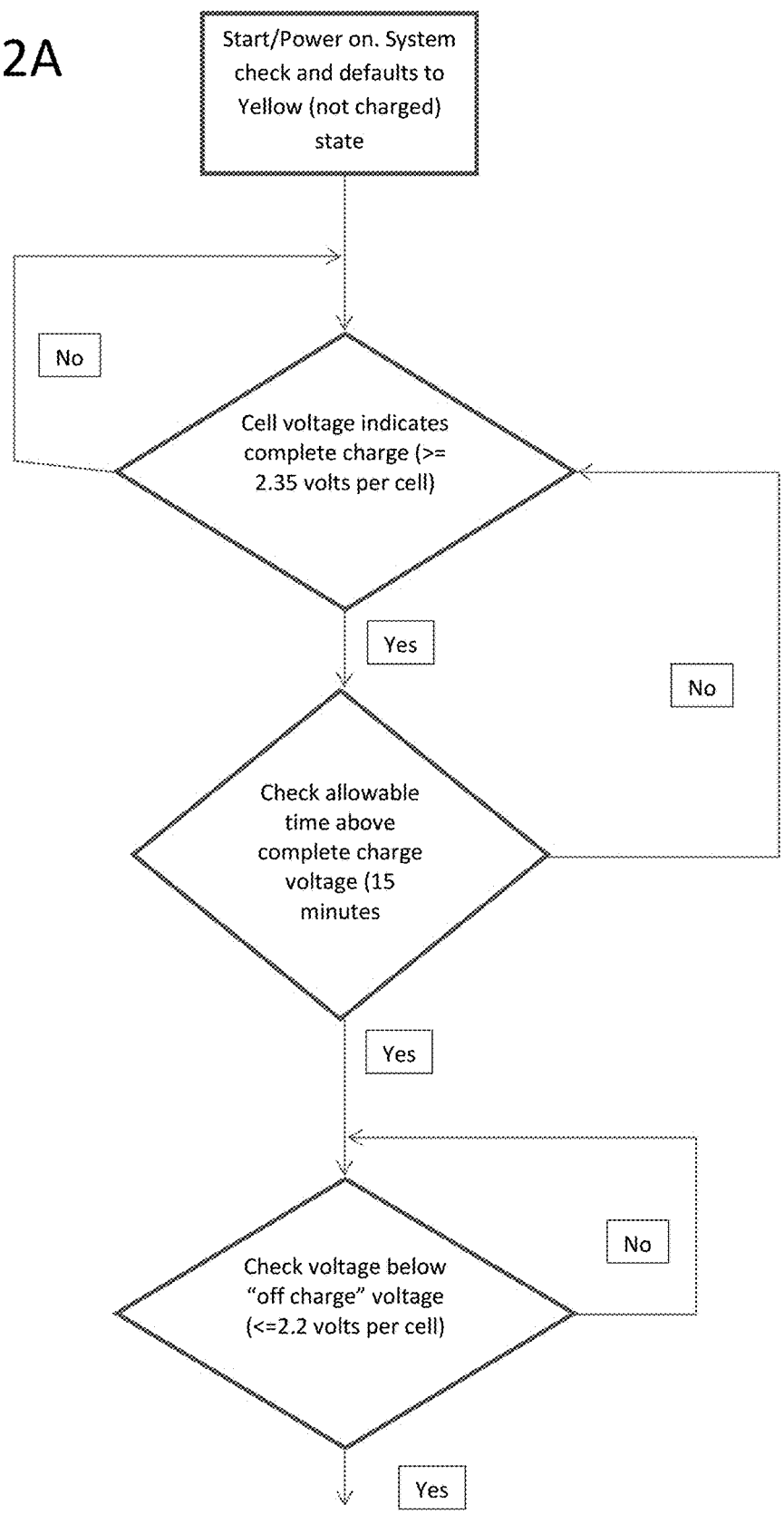
FIGS. 2A and 2B show a flow chart showing the microcontroller logic in the preferred embodiment.

There are many possibilities for the microcontroller but the preferred embodiment used a PIC series microcontroller from Microchip or an AVR series microcontroller from ATMEL. The program will be small and only limited long term storage may be needed, so the microcontroller can be very inexpensive. FIG. 2C shows chip and electronic components of this type with inputs and outputs designated for use in the autonomous charge state indicator. A nominal voltage of 12 VDC, from the serial battery cells to which the autonomous charge state indicator is attached, is applied to the voltage regulator U2 which coverts this voltage to 5 VDC (pin 1 of U2) to be input to the microcontroller U3, which functions as the voltage level monitoring circuit. Deviations from nominal 12 VDC applied to voltage regulator U2 are not relatively large, because a fully discharged battery might still apply a voltage of 11 VDC to voltage regulator U2. C1 and C2 on U2 are a filtering circuit to clean up the voltage input from the serial battery cells to which the autonomous charge state indicator is attached. VBAT is input to chip U3 and is the voltage referred to in FIGS. 2A and 2B.

Figure 4B:
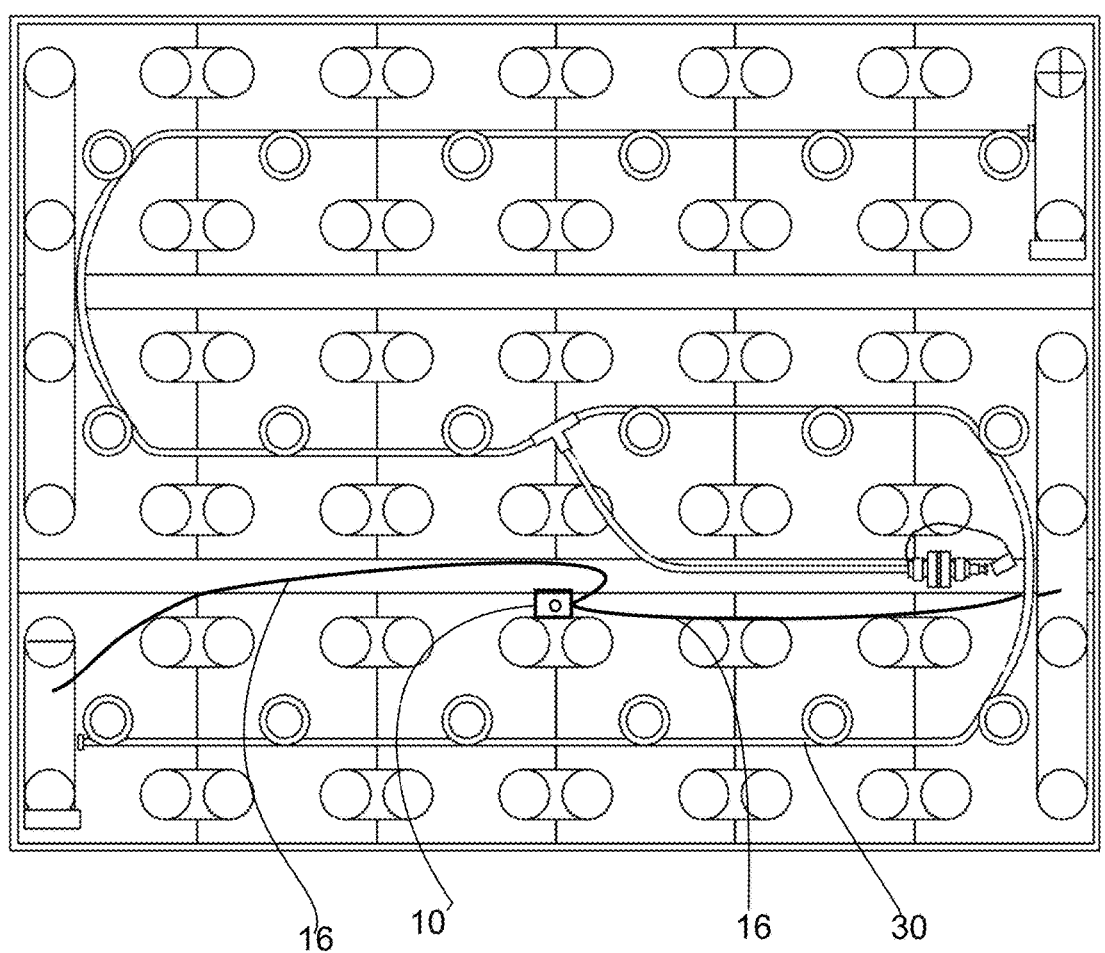
FIG. 4B is a view of another battery having a larger number of cells and employing both an autonomous charge state indication and a battery watering system.

Each unit is standalone or autonomous. It does not have to be networked to the other units. Installation of an autonomous charge state indicator to a conventional battery consists of the steps of attaching two wires to the battery and mounting the main unit on the battery with tie straps, which for convenience may engage conventional cell connectors on the associated lead-acid battery. No special previously manufactured battery is necessary for use of the autonomous charge state indicator, which is suitable for use with any battery of the type used to power industrial material handling vehicles, such as lift trucks. Self tapping screws can be used to attach the leads to standard battery cell terminal posts. This installation can typically be done in less than five minutes. Skilled installation labor is not required and the monitoring device can be installed by an end user using only a power screwdriver to attach the self tapping screws to the selected cell terminal posts. Alternatively the monitoring unit can be installed at a battery factory and shipped with the battery, requiring no end user installation. This monitoring unit can also be combined with other monitoring devices, such as an electrolyte level sensor. The unit is small (about 1"×1"×1") with a very bright LED to facilitate easy viewing. The monitor can be mounted anywhere on the battery that will make it easier to see when mounted in the operator's battery charging racks, although the visible light source can be sufficiently strong so that a user need not have a direct line of sight to the visible light source bulb. Leads of sufficient length permit the monitor to be connected to the center of a battery, but the light can be strapped to an edge of the battery for easier observation. FIG. 4A is a view of a typical fork truck battery (38"×16") with a battery monitor or autonomous charge state indicator 10 mounted near the center of the top side of the battery 2. FIG. 4A shows the relative scale of the monitor to a typical fork truck battery. FIG. 4A also shows an example of connecting the autonomous charge state indicator 10 to the battery. The wires or leads 16 to the monitor 10 have ring terminals, as shown in FIG. 3, that are attached to the battery terminals via self-tapping screws. FIG. 4B is a view of an eighteen cell, twenty seven plate lead-acid battery having a larger number of battery plates than the battery shown in FIG. 4A and showing the autonomous charge state indicator 10 connected to only a portion of the battery cells. In addition to the autonomous charge state indication 10, a battery watering system 30, employing a series of valves and interconnecting tubing, is also located on the top surface of the battery. The two systems can therefore be employed on the same battery, without interference or complication.

The LED employed as a visible light source is specifically chosen for brightness (>2600 mcd) and the potting box lens is constructed to disperse the light in all directions. In this configuration, a user can see and judge the light from a distance (>50 feet), and a user does not need to have direct line of sight to see the light emitted from the visible light source.

Figure 2B:
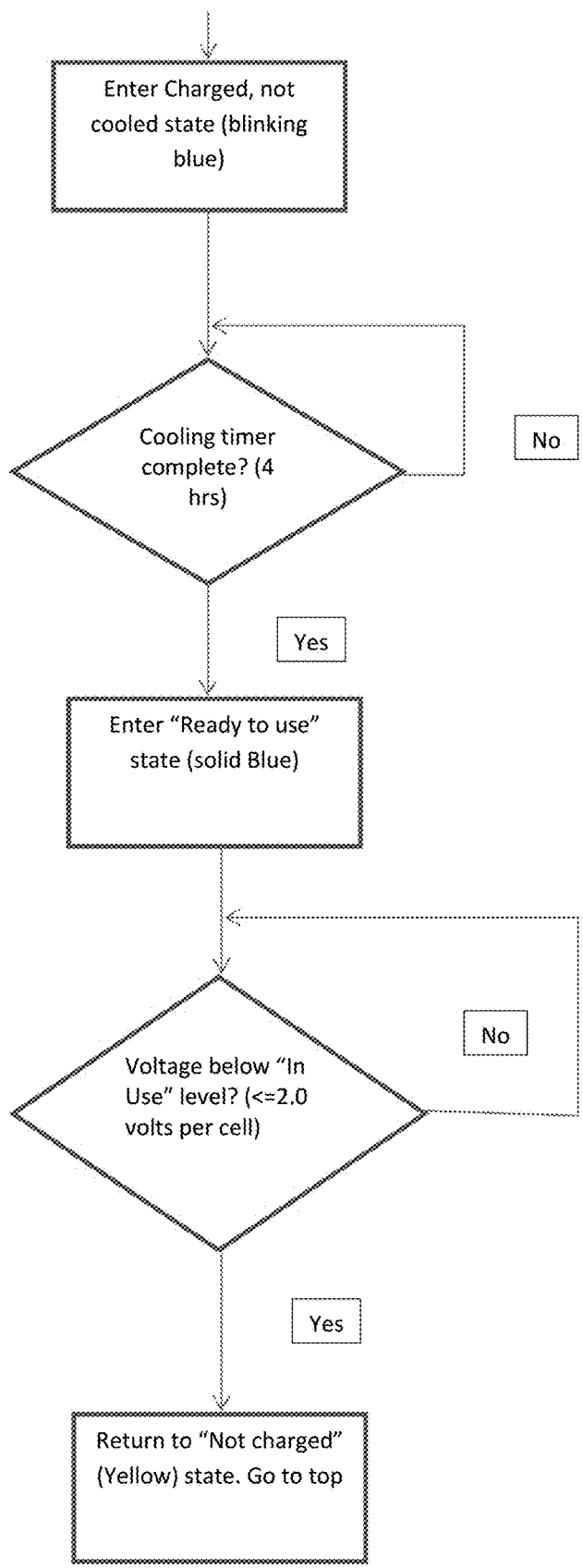

The flow chart in FIGS. 2A and 2B includes representative values of reference voltage levels employed in conjunction with the microcontroller logic and the schematic if FIG. 2C of showing typical components that can be employed to implement this invention.

Please refer to FIG. 3 for an example of the monitoring unit in the preferred embodiment.

The present invention solves several problems by:

Monitoring the charge status of an industrial fork truck battery and displaying that status to the user based on LED illuminated color and blinking. Multiple states are displayed, "In Use or under charge", "Charged but not cooled" and "Charged, cooled and ready to use"

The unit is standalone and continues to display the charge status even if the battery is disconnected from the charger and installed in a fork truck.

The unit is inexpensive, does not need to communicate with other units, does not need to store and report data, installs quickly and is very easy to interpret when in use and displaying status. Simple concept makes it easy to train operators on how to use it. The chip can, however, be programmed to display a code indicating the number of charge cycles that the specific battery has undergone. For example if the unit is disconnected, upon reconnection the visible light indicator can pulse the number of previous charge cycles stored in the chip internal memory.

The unit gets all of its power from the battery it is monitoring. No other wiring to an external source is needed.

There is always an indication on the monitor. If the unit does not have an LED showing, this is an indication that the monitor is damaged or has failed. Without this positive indication, the end user does not know if the battery is just not ready or if the monitoring system has failed.

This full time indication allows the user to quickly audit the state of all batteries in a charging rack. The bright LED allows a survey from a significant distance.

The standalone nature of the device means it is applicable to users that only have a few batteries but still need to know the battery state.

By monitoring which batteries are in the "Not Charged" (yellow) state, the user can quickly identify charger or battery problems that are preventing a battery from receiving a full charge. For example, in a weekday work only application, if all of the batteries were put on charge on Friday evening, they all should be in a solid blue state on Monday morning. If some are still in a yellow state, those chargers should be investigated.

The "Charged but not cooled" indication is useful for situations where all the cooled batteries have been picked but the user must have a charged battery.

Although this monitoring unit and the monitoring system should find it primary use by operators of fork lifts or other battery powered commercial, logistical or industrial equipment, its use is not so limited. For example, this monitor or system can be employed with a fleet of golf carts or in other fleet applications that require the use of a deep discharge battery.

I claim:

1. An autonomous charge state indicator suitable for use on a rechargeable battery to visually indicate separate charge states of the battery, so that an adequately recharged battery can selected from multiple batteries being recharged and can then be mounted in a battery powered industrial material handling vehicle, the indicator comprising:
   a voltage level monitoring circuit connectable between representative cells of the battery at different voltage levels, the magnitude of the different voltage levels being representative of the charge status of the entire battery, the different voltage levels being sufficient to power the autonomous charge state indicator;
   a visible light source displaying differing patterns representative of different charge states of the battery in response to signals from the voltage level monitoring circuit, the visible light source also being powered by the different voltage levels of the battery powering the visible light source and the voltage level indicator, the visible light source being detectable from a distance;
   wherein the autonomous charge state indicator is attachable to only one battery and provides sufficient external communication through the visible light source to enable a user to determine if a specific battery is available to pick for installation in a battery powered industrial material handling vehicle.

2. The autonomous charge state indicator of claim 1 wherein the battery has a total voltage output level that is a positive multiple of the different voltage levels powering the voltage level monitoring circuit and the visible light indicator.

3. The autonomous charge state indicator of claim 1 wherein any individual one of autonomous charge state indicators is suitable for use with batteries having different total voltage output levels.

4. The autonomous charge state indicator of claim 1 wherein the different voltage levels between cells is nominally twelve volts.

5. The autonomous charge state indicator of claim 4 wherein any individual one of the autonomous charge state indicators can be used on either a battery having a total voltage output level of twenty-four volts or a battery having a total output voltage level of thirty-six volts.

6. The autonomous charge state indicator of claim 1 powered from the voltage delivered by six lead acid battery cells.

7. The autonomous charge state indicator of claim 1 wherein the voltage level monitoring circuit outputs three states, the first state corresponding to battery in use or under charge, the second state corresponding to fully charged but not cooled, and the third state corresponding to charged, cooled and ready for use on a battery powered industrial material handling vehicle.

8. The autonomous charge state indicator of claim 1 wherein autonomous charge state indicator detects a voltage level decrease below a maximum voltage achieved during the charging process to indicate that the battery is fully charged but not cooled.

9. The autonomous charge state indicator of claim 8 wherein the battery has been allowed to cool, when not under charge, for at least four hours after the second state is indicated before the third state is indicated by the visible light source.

10. The autonomous charge state indicator of claim 9 wherein the visible light indicator different displays distinct patterns for the first state, the second state and the third state.

11. The autonomous charge state indicator of claim 1 including leads attachable to two cell terminal posts in battery cells having different voltage levels.

12. The autonomous charge state indicator of claim 1 wherein the number of previous charging cycles is detected and stored by the voltage level monitoring circuit and a code is displayed by the visible light source to communicate the number of previous charging cycles.

13. The autonomous charge state indicator of claim 1 attachable to a previously manufactured battery.

14. The autonomous charge state indicator of claim 13 including leads attachable to terminal posts in two battery cells with different voltages in the previously manufactured battery.

15. The autonomous charge state indicator of claim 14 including a strap securable to a battery post connector separate from the two battery cells by other battery cells so that the indicator can be positioned between the two battery cells.

16. The autonomous charge state indicator of claim 1 wherein the visible light source has sufficient brightness so that the differing patterns representative of different charge states can be observed from locations without direct line of sight observation of the autonomous charge state indicator.

17. A rechargable lead-acid battery of the type suitable for use in a battery powered industrial material handling vehicle, the lead-acid battery comprising:
   a plurality of lead-acid battery cells serially connected to deliver an output voltage suitable for powering the battery powered industrial material handling vehicle;
   an autonomous charge state indicator mounted on the rechargeable lead acid battery to visually indicate separate charge states of the battery, so that an adequately recharged battery can selected from multiple batteries being recharged and can then be mounted in a battery powered industrial material handling vehicle, the indicator further comprising;
   a voltage level monitoring circuit connectable to selected multiple serially connected lead-acid battery cells, the magnitude of the resultant voltage difference applied to the voltage level monitoring circuit being representative of the charge status of the entire battery and sufficient to power the autonomous charge state indicator; the voltage level monitoring circuit outputting information indicative with the number of previous charge cycles of the battery, and
   a visible light source displaying differing patterns representative of different charge states of the battery in response to signals from the voltage level monitoring circuit, the visible light source also being powered by the voltage difference applied to the voltage level monitoring circuit, the visible light source being detectable from a distance;
   wherein the autonomous charge state indicator is attachable to only one battery and provides sufficient external communication through the visible light source to enable a user to determine if a specific battery is available to pick for installation in the battery powered industrial material handling vehicle without requiring reference to other information.

18. The rechargeable lead-acid battery of claim 17 also including a battery watering system mounted on the battery.

19. In a charging system for use in charging and circulating rechargeable lead-acid batteries in a fleet of battery powered industrial material handling vehicles, the system including:
   a charging station including at least one charger and a charging rack for in which lead-acid batteries in a discharged state are positioned and connected to a charger after removal an individual battery from a battery powered industrial material handling vehicle in which the individual battery is in a discharge state, the charging rack and the at least one charger having space to accommodate multiple batteries; the improvement comprising:
   an autonomous charge state indicator mounted on and associated with each of the rechargeable lead-acid batteries to visually indicate separate charge states of the associated battery, so that an adequately recharged battery can be selected from multiple batteries being recharged and can then be mounted in a battery powered industrial material handling vehicle, the indicator further comprising;
   a voltage level monitoring circuit connectable to selected multiple serially connected lead-acid battery cells in the associated lead-acid battery, the magnitude of the resultant voltage difference applied to the voltage level monitoring circuit being representative of the charge status of the entire associated battery and sufficient to power the autonomous charge state indicator; and
   a visible light source displaying differing patterns representative of different charge states of the associated battery in response to signals from the voltage level monitoring circuit, the visible light source also being powered by the voltage difference applied to the voltage level monitoring circuit, the visible light source being detectable from a distance;
   wherein the autonomous charge state indicator is attachable to only one associated battery and provides sufficient external communication through the visible light source and not through the charger so that a user can determine if a specific battery is available to pick for installation in the battery powered industrial material handling vehicle without requiring reference to other information.

20. In a charging system of claim 19 wherein the voltage level monitoring circuit of each autonomous charge state indicator includes a delay state allowing each battery to cool for a specified period after reaching a fully charged state, with the visible light source displaying a different pattern when the associated battery is in the fully charge state from the pattern when the associated battery is in a charged and cooled state.

* * * * *